United States Patent
Meyer et al.

(10) Patent No.: US 6,206,560 B1
(45) Date of Patent: Mar. 27, 2001

(54) THROTTLING MEANS FOR EXTRUDERS OF THE TRANSFERMIX TYPE

(76) Inventors: Paul Meyer, Via Locarno 27 B, CH 6612, Ascona (CH); Hans-Dieter Wagner, Karl Ambrusterstrasse 2, D74805, Eggingen; Florian Fischer, Kalteneck 3, D85560, Ebersberg, both of (DE)

(*) Notice: Subject to any disclaimer, the term of this patent is extended or adjusted under 35 U.S.C. 154(b) by 0 days.

(21) Appl. No.: 09/446,940
(22) PCT Filed: May 4, 1999
(86) PCT No.: PCT/GB99/01381
§ 371 Date: Mar. 13, 2000
§ 102(e) Date: Mar. 13, 2000
(87) PCT Pub. No.: WO99/56938
PCT Pub. Date: Nov. 11, 1999

(30) Foreign Application Priority Data

May 1, 1998 (GB) .................................................. 9809268

(51) Int. Cl.⁷ .......................................................... B29B 7/42
(52) U.S. Cl. ................................ 366/79; 366/80; 366/90
(58) Field of Search .................................. 366/80, 79, 89, 366/77, 90, 81, 82; 425/207, 209, 382.4, 557, 558

(56) References Cited

U.S. PATENT DOCUMENTS

| | | |
|---|---|---|
| 3,245,115 * | 4/1966 | Ecklund .................................. 366/77 |
| 3,522,627 | 8/1970 | Vanzo . |
| 4,136,969 * | 1/1979 | Meyer .................................... 366/90 |
| 5,403,178 * | 4/1995 | Steger .................................. 425/557 |

FOREIGN PATENT DOCUMENTS

| | | |
|---|---|---|
| 1 502 243 | 3/1969 | (DE) . |
| 1 913 615 | 10/1969 | (DE) . |
| 0 345 687 | 12/1989 | (EP) . |
| 0 490 362 A1 | 6/1992 | (EP) . |
| 0 509 779 B1 | 3/1996 | (EP) . |
| 0 574 172 B1 | 8/1996 | (EP) . |
| 0 587 574 B1 | 1/1997 | (EP) . |
| 842692 | 7/1960 | (GB) . |
| 1 585 531 | 3/1981 | (GB) . |
| 1 585 532 | 3/1981 | (GB) . |

* cited by examiner

Primary Examiner—Tony G. Soohoo
(74) Attorney, Agent, or Firm—Leydig, Voit & Mayer, Ltd.

(57) ABSTRACT

An extruder of the Transfermix type comprises a barrel in which a screw rotates for transporting and mixing viscoelastic compounds. The extruder has an inlet, a compression section, a plasticizing section and an exit section. The plasticizing section is of the Transfermix type, in which a helical groove in the screw varies in cross section from full area to zero area, while the cross section of an oppositely handed helical groove in the barrel varies from zero to full area. A return section follows the plasticizing section, and the operative contact-surface of the return section is formed by a sleeve which forms a cylindrical gap between the sleeve and the screw, the sleeve being axially movable to close or open the gap to produce a continuously adjustable throttle.

8 Claims, 1 Drawing Sheet

1

THROTTLING MEANS FOR EXTRUDERS OF THE TRANSFERMIX TYPE

BACKGROUND OF THE INVENTION

This invention relates to continuously operating mixers and extruders for flowable media mainly, but not exclusively, of the visco-elastic kind, having an inlet, an outlet and between these at least a mixing/plasticising section of the Transfermix type.

GB-A-842 692 shows a Transfermix section, relating particularly to mixers and extruders comprising a driven rotor and a stator having respectively an internal and an external helical groove, the grooves being coaxial but of opposite hand and the helical groove in the one component, e.g. the rotor, varying from a full flow cross-section to zero cross-section over the axial length of one Transfermix section while the helical groove in the other component, e.g. the barrel, varies from zero cross-section to full cross-section over substantially the same axial length, and vice versa in a possibly following Transfermix return section. In operation, the material being transported initially in the one component at the entry to the Transfermix section is transferred layer-by-layer from this as the giver-component to the other as the taker-component until by the end of a Transfermix section it will have been transferred, mixed and worked layer by layer in an orderly sequence.

A Transfermix section provides the property that throttling of the flow material changes the intensity with which the throughput is being influenced, more particularly the mechanical work input, in any case uniformly but to a degree of uniformity which depends upon the geometrical design of the Transfermix section.

A first generation of Transfermix is described in GB-A-842 692, while GB-A- 1 585 531 and 1 585 532 show a second generation with multiple grooves, and EP-B-0 574 172 shows a third generation with longitudinal mixing.

In extruders or mixers having the function of shaping an extrudate through a die at the end of the outlet-section, the amount that the medium is throttled is predetermined by the cross-sectional shape, form and length of its flow-channel. However, the concern of this invention is with additional throttles for influencing the amount of work input into the medium generally and compensating for different throttle-effects inherent in different dies that may be used, in order to obtain a required quality in the first place and the same quality of the extrudate out of different dies, in the second place. Throttling devices could also be formed by screens situated at the outlet end of the screw, if required for the removal of particulate impurities from the extrudate, but their throttling effects are a given quantity similar to the resistance of dies. However, backing plates for such screens can form a step-wise adjustable throttle, particularly if used in some form of screen changer. The backing plates have different sizes of holes as originally needed to support different screen-packs composed of wire-mesh situated past the end of the rotor screw.

A continuously adjustable throttle at that position in the extruder is described particularly in GB 1 585 532. This throttle is in the form of conically-ended pins which can be moved radially into and out of the circular flow-cross-section, or even of a single pin of a diameter almost equal to that of the circular flow-cross-section and with a rounded end which can be moved across the flow to fit the opposite wall of the channel. Practical work with such throttles established that with Transfermix sections of suitable intensity, as available for the second generation of Transfermix, very difficult-to-plastify rubber compounds—at that time natural rubber compounds with high loadings of fine carbon-blacks—could be satisfactorily plastified with only less than 5% of the cross-sectional area being left available for flow. The throughputs were still acceptably high, as explained below, although this probably occurs only with a Transfermix section of suitable geometry.

If an easy-to-plastify compound with no throttling reached an output of satisfactory quality with an output of X Kg/hr, then the difficult-to-plastify compound would, at the same screw speed, provide an output of 2, 3 or 4 times this quantity, albeit of insufficiently plastified material with cold lumps in it and a knobbly surface and probably running unstabily. Throttling would then provide improvement in plastification, frequently enough down to a throughput of a similar magnitude as X Kg/hr, or perhaps down to around 50% of X. This would still be very satisfactory, when extruders with other plastifying sections would not permit sufficient plastification at any throughput.

Such throttles have the following drawbacks:
1. They produce a pressure peak at the end of the screw when put into action, so that, in addition of the desired action of slowing down the flow in the plasticising section, they produce a pressure back-flow in the transport screw between the Transfermix section and the end of the screw. This produces an unnecessary build up of heat, which may be a limiting factor for certain compounds.
2. When the throttle pins are withdrawn completely, they leave openings in the cylindrical wall of the casing in which compound cannot be moved and is in danger of curing-up and then in later running contaminating the flow.
3. Whereas a Transfermix section is self-cleaning up to the end of the screw, this type of throttle holds quite an amount of rubber when operation ceases which cannot be got out even with an extrusion head which is openable for cleaning. This is a disadvantage on changing compounds.

EP-A-0 509 779 (Meyer) shows a throttle with pins having frusto-conical ends situated in the barrel immediately after the Transfermix section and operating into a circumferential cut in the transport screw, thereby doing away with any unwanted heat build-up up to the end of the transport screw. However, it has the second disadvantage mentioned above. Even where the frusto-conical pins are without any internal pins permanently in place, as described, the necessary gap in the screw additionally reduces its transport and pressure-buildup action.

EP-A-0 490 362 (Capelle) shows radial pins, radially adjustable, in the deepest grooves of the barrel at the transition section between a first and a second Transfermix zone. While avoiding the three disadvantages quoted above, the clearance gaps between the pins and sides of the helical grooves in the barrel, see FIGS. 5 and 6, must be of a considerable magnitude in order to prevent trapping and curing up compound in the grooves themselves when the throttle pins are moved in. This feature prevents a closure to anywhere near 95%—more likely remaining well under 90% or even less, calculated as a percentage of the total flow area of the stator grooves, especially as the necessary clearance between internal thread-lands of the barrel and the opposite ungrooved surface of the screw has to be added. In this way the plastification of a number of compounds at the difficult end of the range is excluded.

EP-A- 0 345 687 (H. D. Wagner and H. Holzer) shows an adjustable barrier at the end of a plasticizing section of a vacuum extruder, comprising two relatively adjustable rings, one fixed and the other one rotatable, which when opened have axially co-extending gaps and by means of rotation can close these to a required degree.

This arrangement has been used at the position between a first and second Transfermix section, where the first Transfermix section has a geometry of the third generation, including longitudinal mixing, and where this first Transfermix section, in which the plastification has mainly to be completed, is long and the return section is as short as is needed not to restrict the flow back from the barrel into the screw. This length is generally about the same as the maximum depth of the helical thread in the barrel. With a design of radial "teeth" and gaps being of equal width, this permits throttling of 90–95% of the annular flow, taking into account also the necessary radial clearance between screw and barrel at that position. However, when open it can be free to little more than 50% of the flow-cross-section. With teeth and gaps of lesser width, that much closure is no longer possible while complete opening is still impossible. This construction, while constructionally simple, has the disadvantage of not providing self-cleaning on the feed of rubber being stopped and the screw being run empty for cleaning. Self-cleaning is generally very useful and a major need in uses where compounds need to be changed with any frequently and particularly where compounds with metal-adhesive properties are concerned.

EP-A-0 587 574 (Meyer) shows the third generation Transfermix geometry applied to rubber injection moulding machines of the type, where the screw, after effecting plastification into a cylindrical continuation of the barrel as the reservoir, is then pushed forward to provide the piston-action for injecting the compound into the mould. Both the rotation of the screw and its axial motion are frequently effected by oil hydraulic means. As controlled axial positioning of the screw between fully back, for plasticizing, and fully forward, for complete injection, can easily be made a feature of this application and frequently is installed anyway, the use is described of such positioning for continuously adjustable throttling between the end-edge of the second transfer zone in the barrel and the starting-edge of this zone in the screw. This provides for a maximum closure equal to the clearance between the rotor and the barrel, and for a complete opening when the screw is fully withdrawn.

The functional disadvantage here is, however, that axially displacing the screw makes the beginning and the end of the first transfer zone geometries in screw and barrel respectively no longer coincident, that is, the Transfermix action in this, the determining mixing-plasticising section, is interfered with. Another disadvantage arises for an extruder which is normally driven by an electric motor through a reduction gear. Here a device for axially moving and precisely positioning the screw relative to the barrel is quite expensive. The same holds, if the relative axial movement were to come from shifting the barrel-assembly including the extrusion-head relative to the base of the reduction gear casing, besides upsetting the positioning of the die relative to the follow-on machinery.

SUMMARY OF THE INVENTION

According to the present invention, an extruder for visco-elastic compounds comprises a barrel in which a screw is rotatably mounted and driven to coact with the barrel, the extruder comprising successively an inlet for material to be extruded, a compression section, a plasticising section and an exit section, the said plasticising section embodying a Transfermix geometry in which a helical groove in the screw varies in cross-section from full area to zero area and in a substantially corresponding length of the barrel the cross-section of an oppositely handed helical groove varies from zero area to full area, whereby in operation the material is transferred from the screw into the barrel while being mixed and plasticized, and in which following said plasticising section is a return section of which the internal diameter of the operative contact-surface for the material in the barrel is reduced from that corresponding to the greatest depth of the barrel groove to one having substantially a running clearance to the outside diameter of the screw and the helical groove in the screw varies in cross-sectional area from zero to full depth, and in which the operative contact-surface of the said return section in said barrel is formed by a sleeve of at least partially cylindrical shape and having substantially the radial thickness of the maximum depth of said barrel groove, the said sleeve being mounted in said barrel so as to form a substantially cylindrical gap between the radially innermost edge of the operative contact-surface of said sleeve and a diametral edge of the screw at which the depth of the helical groove thereon is substantially zero, the said sleeve being mounted in the said barrel by means adapted to prevent rotation thereof and by means for axially displacing the said sleeve so as to close or open the said gap to produce a continuously adjustable throttling effect between substantially fully open and fully closed.

The throttling gap is therefore formed between the axially movable sleeve and the edge of the screw at the end of the Transfermix section where the helical groove on the screw is of zero depth. This provides continuous adjustment of the gap between completely open and substantially completely closed, but without affecting the self-cleaning or Transfermix action.

Preferably, the operative contact-surface of the said sleeve is provided with a groove of the same hand as the helical groove in said barrel in the plasticising section. This continues transport of the compound, to promote self-cleaning. Conveniently the said helical groove in the said sleeve has a lesser number of starts than the barrel groove in the plasticising section.

Preferably, the threads forming the sides of the said groove in the sleeve project backwards, against the axial direction of flow, by a length equal to the maximum width of the said gap whereby with the gap fully open the said threads form in coaction with the barrel surface the said helical groove also within the gap. This promotes, on account of the relative rotation of the screw, positive transport of the material also within the said gap even when feeding has ceased, and thus self-cleaning.

Further, threads which in part form the groove in the barrel and which correspond in position axially to the threads of the sleeve are shortened in the axial direction by an amount equal to the projection of the sleeve threads, whereas threads which also in part form the barrel groove and which do not so correspond are not shortened.

Preferably, a space in the cylindrical barrel wall which opens upon the sleeve being axially moved from its fully open position is closed against ingress of the material by a thin cylindrical overlap-sleeve having an internal diameter equal to that of the barrel surface and an external cylindrical surface which is supported on both axial sides of the said space against the pressure of the said material and which, when the sleeve is fully open, is substantially flush with the interior surface of the barrel. Thus, when the sleeve is closed to any degree, only a thin layer of the material is actually outside the diameter of the screw and is kept in motion by the sweep of the lands of the screw and when the sleeve is fully opened any such thin layer is squeezed into the flow of material, thereby promoting complete self-cleaning when feeding of the material has ceased.

Conveniently, corresponding edges of the said sleeve and of the said thin overlap-sleeve are bevelled to further the squeezing-out of a thin layer of the material when the gap is being opened and when said gap is fully open, to form a ring-slot which, with a visco-elastic material having cohesion, is swept out by the lands of the screw also when feeding has stopped. This also promotes self-cleaning.

Conveniently, the length of the return section is of the order of the maximum depth of either the helical groove in the screw or that in the barrel.

Thus, the throttle when completely open, presents substantially no spaces in the barrel, from which compound is not moved out by the action of the screw when running empty for cleaning. Further, the throttle which does not inhibit the generic property of a Transfermix extruder being selfcleaning.

BRIEF DESCRIPTION OF THE DRAWINGS

The invention will now be described with reference to the accompanying drawings in which.

DETAILED DESCRIPTION OF THE PREFERRED EMBODIMENTS

Figure 1:
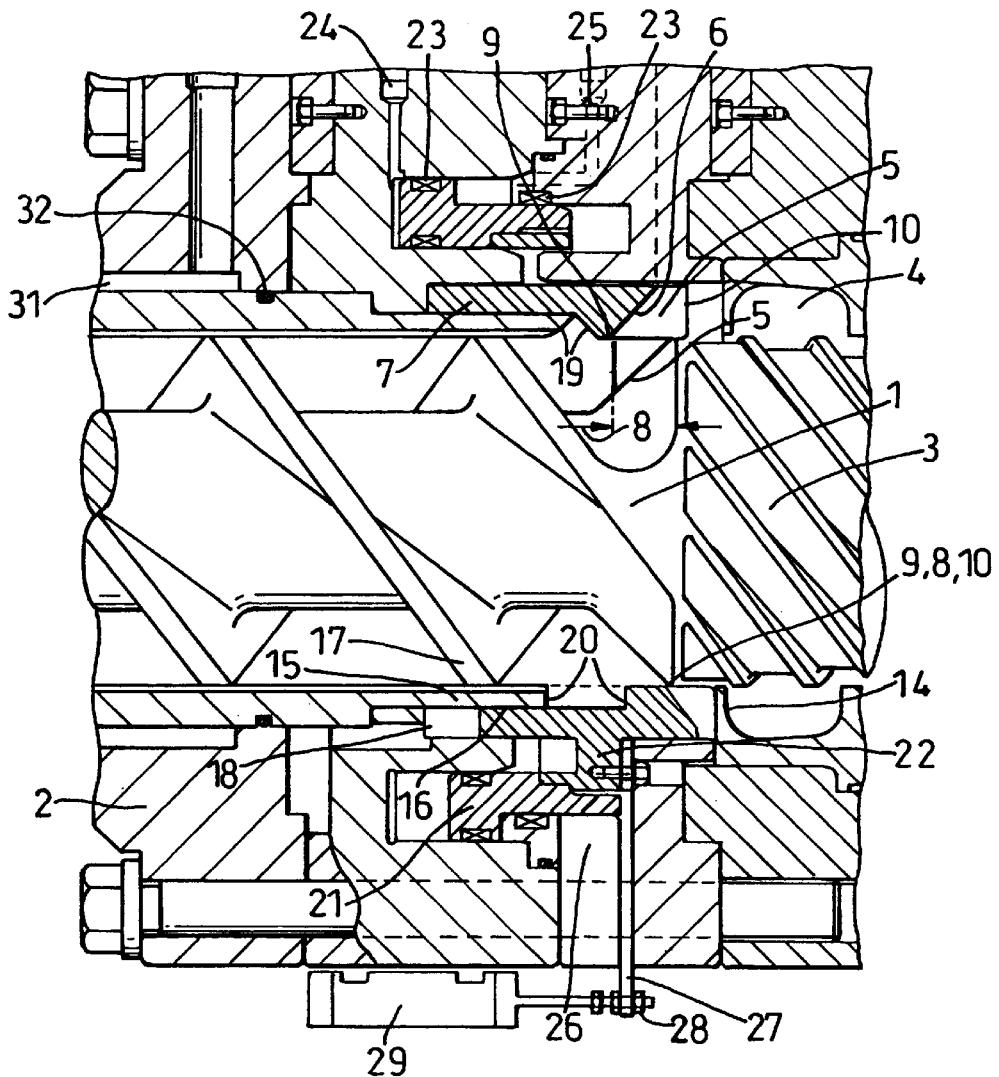
FIG. 1 is a cross-section through an extruder with a Transfermix section, including the throttle of this invention.

FIG. 1 shows an extruder for visco-elastic compounds having an extruder screw 1 rotatably mounted and driven to coact with a barrel 2. Only the plasticising and exit sections of the extruder are shown. Thus the plasticising section of the extruder screw 1 is shown at the end of a Transfermix zone, having helical grooves 3 reducing towards zero cross-section, while the grooves 4 in the barrel 2 of the first Transfermix zone are at maximum cross-section, together with a return section 5 of the screw with its helical grooves going from zero to full flow-cross-section. A part of the exit section of the screw 1 is shown with a transport thread 17 in a cylindrical barrel 18. A throttle at the end of the first Transfermix zone comprises a sleeve 7 having a frusto-conical operating surface 6 forming a radially inner edge 9 which, in co-action with a diametral edge 10 of the screw 1 forms the throttle gap 8. In the upper part of FIG. 1 the throttle sleeve 7 is shown in a position with a throttle fully open and in the lower part of FIG. 1 with the throttle closed. In the closed position the edges 9 and 10 are practically adjacent and the throttle gap 8 is substantially zero in the axial direction but there is a radial gap for material to pass, equal to the running clearance between the screw and the barrel. This is an extreme, though not necessarily practical, position.

Figure 2:
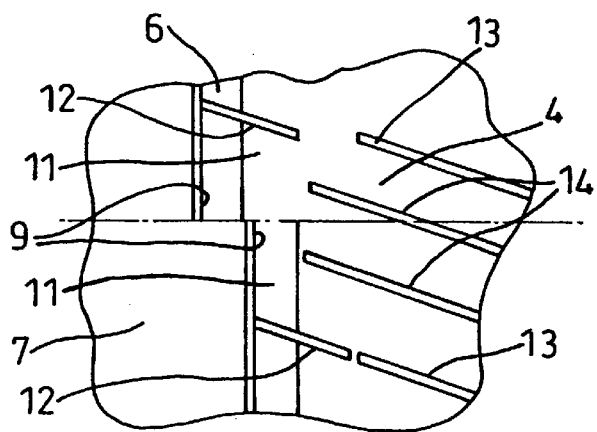
FIG. 2 is a developed view of a part of FIG. 1.

The developed view of FIG. 2, into the barrel and the interior of sleeve 7, shows the preferred embodiment of the return section 5 being a second Transfermix zone. The threads 12 forming its helical grooves 11, are fewer in number than the grooves 4 in the first Transfermix zone, and protrude axially backwards, so that with the throttle open, again shown on the upper part of FIG. 2, there are still the helical grooves 11 to provide for transport, which is important for self-cleaning. Those threads 13 in the first Transfermix zone, which correspond to threads 12 are shortened, such that when the throttle is positioned towards being closed, threads 13 and 12 become substantially continuous. Those threads 14 in the first Transfermix barrel which have no such correspondence, are of full length.

FIG. 1 shows a space 18 which of necessity would open in the barrel wall at the end of sleeve 7 when this is moved towards closure of the throttle, and which is closed by a thin overlap sleeve 15 to prevent ingress of the material into it. The outer surface 16 of the overlap sleeve 15 bears against sleeve 7, which slides on it to provide the necessary stiffness. On the upper part of FIG. 1, the corresponding edges 19 of sleeve 7 and of overlap sleeve 15 are shown bevelled, and in the lower part of FIG. 1 these are shown plane radial at 20. For the lower embodiment, the axial force on the sleeve 7 in moving to the position of throttle open squeezes out the thin layer of material which is outside the screw when the sleeve 7 is moved into any partly closed position. For the upper embodiment, the sweep of the lands 17 of the transport screw draws out any remaining material from between the bevelled edges 19 when feeding has stopped. One way or another, possibly depending on the nature of the material being treated, it is assured that no material remains in any section of the extruder swept by the rotating screw, which is as much self-cleaning as is possible.

FIG. 1 shows as a preferred embodiment for moving the sleeve 7 an hydraulic device, with an annular piston 21 connected by spokes 22 to the sleeve 7. These spokes bear against parts of the barrel 2 to prevent rotation of the whole assembly. The piston is made oil-tight by sealing ring means known in the art, shown at 23. Hydraulic ducts 24 and 25 lead to the pressure spaces at either side of the piston 21. Spaces where ingress of material and/or leakage of hydraulic oil might take place are vented to outside the barrel. One such vent 26 on the underside of the barrel is shown opened up to provide a slot for an arm 27 attached to sleeve 7, to move the piston rod 28 of an electronic position sensing device 29 attached to the underside 30 of barrel 2. This position sensor is a necessary part of the control means which controls exactly the position of sleeve 7 and thus the degree of opening of the throttle. Also indicated at 31 is the duct for tempering-fluid to control the temperature of barrel 2, with its O-ring 32 for sealing.

It will be understood that this hydraulic device is a preferred one among many other possible devices. Some of these may be purely mechanical such as a provision on the outside of sleeve 7 of a screw-thread of a low lead, engaging with (not shown) its counterpart in a rotatable ring, mounted in barrel 2. The ring is itself moved by a suitable gear wheel mounted in the barrel 2 and moved by external means.

What is claimed is:

1. An extruder for visco-elastic compounds comprising a barrel in which a screw is rotatably mounted and driven to coact with said barrel, said screw having a helical groove, and said barrel having an operative contact surface for material to be extruded said extruder comprising successively an inlet for material to be extruded, a compression section, a plasticising section and an exit section, said plasticising section embodying a Transfermix geometry in which aid helical groove in said screw varies in cross-section from full area to zero area and in a substantially corresponding length of said barrel the cross section of an oppositely handed helical groove varies from zero area to full area, whereby in operation the material is transferred from said screw into said barrel while being mixed and plasticized, and in which following said plasticizing section is a return section of which an internal diameter of said operative contact surface for the material in said barrel is reduced from that corresponding to the maximum depth of said barrel groove to one having substantially a running clearance to an outside diameter of said screw and said helical groove in said screw varies in cross-sectional area from zero to full depth; in which said operative contact surface of the said return section in said barrel is formed by a sleeve of at least partially cylindrical shape and having a radial thickness substantially equal to said maximum depth of said barrel groove, said sleeve being mounted in said barrel so as to form a substantially cylindrical gap between an innermost edge of the operative contact surface of said sleeve and a diametral edge of said screw at which the depth of said helical groove thereon is substantially zero, said sleeve being mounted in the said barrel by means adapted to prevent rotation thereof and by means for axially displacing said sleeve as to close or open said gap to produce a continuously adjustable throttling effect between substantially fully open and fully closed.

2. An extruder according to claim 1, wherein said operating contact surface of said sleeve is provided with a groove of the same hand as said helical groove in said barrel in said plasticizing section.

3. An extruder according to claim 2, wherein said barrel groove in said plasticizing section has a plurality of starts and said helical groove in said sleeve has a lesser number of starts than said barrel groove in said plasticizing section.

4. An extruder according to claim 3, wherein the sides of said groove in said sleeve are jarred by threads that project backwards against the axial direction of flow, by a length equal to the maximum width of said gap, whereby with said gap fully open said threads form in coaction with the barrel surface the said helical groove also within said gap.

5. An extruder according to claim 4, wherein said groove in said plasticizing section of said barrel is formed in part by threads which correspond in position axially to said backwardly projecting threads of said sleeve, said corresponding threads in said barrel being shortened in the axial direction by an amount equal to the projection of said backwardly projecting sleeve threads.

6. An extruder according to claim 1, wherein a space in the cylindrical barrel wall which opens upon said sleeve being axially moved from its fully open position is closed against ingress of the material by a thin cylindrical overlap sleeve, having an internal diameter equal to that of the barrel surface and an external cylindrical surface which is supported on both axial sides of said space against the pressure of the said material and which when said sleeve is fully open is substantially flush with the interior surface of said barrel.

7. An extruder according to claim 6, wherein corresponding edges of said sleeve and of said thin overlap sleeve are bevelled to further the squeezing out of a thin layer of the material when said gap is being opened and when said gap is fully open, to form a ring slot which, with a visco elastic material having cohesion, is swept out by the lands of said screw also when feeding has stopped.

8. An extruder according to claim 1, wherein the length of said return section is of the order of the maximum depth of either said helical groove in said screw or said helical groove in said barrel.

* * * * *

UNITED STATES PATENT AND TRADEMARK OFFICE
CERTIFICATE OF CORRECTION

PATENT NO.     : 6,206,560 B1
DATED          : March 27, 2001
INVENTOR(S)    : Meyer et al.

It is certified that error appears in the above-identified patent and that said Letters Patent is hereby corrected as shown below:

<u>Title page,</u>
Insert:
-- [73]  Assignee:  A-Z Formen-und Maschinenbau GmbH --

Signed and Sealed this

Twelfth Day of November, 2002

*Attest:*

JAMES E. ROGAN
*Director of the United States Patent and Trademark Office*

*Attesting Officer*